United States Patent
Deffenbaugh et al.

(10) Patent No.: US 6,885,941 B2
(45) Date of Patent: Apr. 26, 2005

(54) METHOD FOR PREDICTING PROPERTIES OF A SEDIMENTARY DEPOSIT FROM A THICKNESS CONTOUR OF THE DEPOSIT

(75) Inventors: Max Deffenbaugh, Houston, TX (US); John C. Van Wagoner, Houston, TX (US); Neal L. Adair, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/829,600

(22) Filed: Apr. 22, 2004

(65) Prior Publication Data

US 2004/0260472 A1 Dec. 23, 2004

Related U.S. Application Data

(60) Provisional application No. 60/466,655, filed on Apr. 30, 2003.

(51) Int. Cl.[7] ............................................. G06F 19/00
(52) U.S. Cl. ........................................... 702/2; 702/12
(58) Field of Search ........................... 702/2, 6, 11, 12, 702/13, 14, 16; 703/2, 5, 9; 367/73

(56) References Cited

U.S. PATENT DOCUMENTS

| | | | |
|---|---|---|---|
| 3,268,858 A | 8/1966 | Winter | 340/15.5 |
| 4,821,242 A | 4/1989 | Hennington | 367/53 |
| 6,246,963 B1 | 6/2001 | Cross | 702/14 |

FOREIGN PATENT DOCUMENTS

EP   RS 110156   1/2004

OTHER PUBLICATIONS

Bradford, S. F. and Katopodes, N. D. (1999) "Hydrodynamics of Turbid Underflows: I: Formulation and Numerical Analysis", *Jrnl. of Hydraulic Engineering*, Oct. 1999 pp. 1006–1015.

Chaudhry, M. H. (1993) "Open–Channel Flow", Englewood Cliffs, NJ: Prentice–Hall, Contents Listing.

Dietrich, W. E. (1982) "Settling Velocity of Natural Particles", *Water Resources Research*, vol. 18, no. 6, Dec. 1982, pp. 1615–1626.

(Continued)

*Primary Examiner*—Donald McElheny, Jr.
(74) *Attorney, Agent, or Firm*—Gary P. Katz

(57) ABSTRACT

The properties of a water-lain sedimentary deposit may be predicted at any location from a contour of constant deposit thickness. One embodiment of the method comprises (a) determining an outline of constant deposit thickness in a measured deposit, (b) determining the fluid flow properties at the inlet of the measured deposit, (c) determining a property of the deposit at any point inside the deposit from modeling the fluid flow. The properties of the deposit at any point may include the thickness of the sediment body, the size of the body, the shape of the body, and the grain size distribution at each point within the body, and any combination thereof.

19 Claims, 3 Drawing Sheets

OTHER PUBLICATIONS

Garcia, M. and Parker, G. (1991) "Entrainment of Bed Sediment Into Suspension", *Jrnl. of Hydraulic Engineering*, vol. 117, no. 4, Apr. 1991, Paper No. 25706, pp. 414–435, ISSN 0733-9429/91/0004-0414.

Garcia, M. (1993) "Experiments on the Entrainment of Sediment Into Suspension by a Dense Bottom Current", *Jrnl. of Geophysical Research*, vol. 98, no. C3, Mar. 15, 1993, pp. 4793–4807.

Hager, W. H. (1996) "Alluvial Channel Geometry: Theory and Applicaitons", *Jrnl. of Hydraulic Engineering*, Dec. 1996, pp. 750.

Huang, H. Q. (1996) "Discussion on: Alluvial Channel Geometry: Theory and Applications", *Jrnl. of Hydraulic Engineering*, Dec. 1996, pp. 750–751.

Huang, H. Q. and Nanson, G. C. (2000) "Hydraulic Geometry and Maximum Flow Efficiency as Products of the Principle of Least Action", *Earth Surface Processes and Landforms*, vol. 25, pp. 1–16.

Imran, J. and Parker, G. (1998) "A Numerical Model of Channel Inception on Submarine Fans", *Jrnl. of Geophysical Research*, vol. 103, no. C1, Jan. 15, 1998, pp. 1219–, 1222,1224,1226,1228,1230,1232,1234,1236,1238.

Parker, G. et al. (1986) "Self–Accelerating Turbidity Currents", *Jrnl. Fluid Mech*, vol. 171, Mar. 24, 1986, pp. 145–179.

METHOD FOR PREDICTING PROPERTIES OF A SEDIMENTARY DEPOSIT FROM A THICKNESS CONTOUR OF THE DEPOSIT

This application claims the benefit of U.S. Provisional Patent Application No. 60/466,655 filed on Apr. 30, 2003.

FIELD OF THE INVENTION

This invention relates generally to the field of geologic modeling. Specifically, the invention is a method capable of determining the properties of a sedimentary deposit such as, three-dimensional size and shape and grain size distribution throughout the deposit from the size and shape of a single contour of constant deposit thickness.

BACKGROUND OF THE INVENTION

In the oil and gas industry, seismic prospecting techniques commonly are used to aid in the search for and evaluation of subterranean hydrocarbon deposits. A seismic prospecting operation consists of three separate stages: data acquisition, data processing, and data interpretation, and success of the operation depends on satisfactory completion of all three stages.

In the data acquisition stage, a seismic source is used to generate an acoustic signal that propagates into the earth and is at least partially reflected by subsurface seismic reflectors. The reflected signals are detected and recorded by an array of seismic receivers located at or near the surface of the earth, in an overlying body of water, or at known depths in boreholes.

During the data processing stage, the recorded seismic signals are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

At present, the conclusions which can be made after the data interpretation stage are generally limited to broad descriptions of the size and general nature of subsurface structures. The descriptions may for example provide an indication of the total volume of hydrocarbons which might be retained in such structures. However, present technology does not allow the analyst to determine preferred locations within a structure for drilling wells, except in a very broad sense. In addition, when an exploration well has been drilled, present technology does not allow an analyst to be able to accurately characterize the nature of the subsurface structure in locations other than in the most immediate region of any such well.

As will be understood from this summary of the data interpretation stage of the seismic prospecting operation, it is desirable to be able to predict the broad nature of a subsurface structure of interest using only seismic data and without having to drill exploration wells. Such a capability would facilitate estimation of hydrocarbon volume in place and production rates early in the hydrocarbon exploration and development process. Hydrocarbon volume and rate of production depend on a variety of factors, including the grain size distribution and thickness of the sand deposit that makes up the reservoir in which the hydrocarbons are found. Accordingly, there is a need for a method for predicting that grain size distribution at every location within a sand deposit and for predicting the three-dimensional size and shape of the deposit. More specifically, there is a need for a method of using a contour of constant deposit thickness to determine the size, shape, and distribution of internal properties, including grain size distribution, in the body. The present invention satisfies that need.

SUMMARY OF THE INVENTION

A method for predicting the properties of a water-lain sedimentary deposit at any location from a contour of constant deposit thickness is disclosed. The method comprises (a) determining a contour of constant deposit thickness of the measured deposit, (b) using the contour to aid in determining the fluid flow properties at the inlet of the measured deposit, (c) determining a property of the deposit at any point inside the deposit from simulating the fluid flow. The properties of the deposit may include the thickness of the sediment body at any point, the size of the body, the shape of the body, and the grain size distribution at any point within the body, and any combination thereof.

A second embodiment is disclosed for predicting properties of a water-lain sedimentary deposit at any point within the deposit from a contour of constant deposit thickness. The method comprises (a) determining at least one outline of constant deposit thickness in the measured deposit, (b) identifying an inlet point and an end point on that outline, (c) creating a backbone curve connecting the inlet point and end point for the measured deposit and creating ribs perpendicular to the backbone, (d) estimating the flow properties at the inlet of the measured deposit, (e) creating a simulated deposit by simulating the flow properties and deposit properties corresponding to the estimated inlet flow properties, (f) determining the backbone and ribs of the simulated deposit, (g) repeating steps (d) through (g) until the rib lengths of the simulated deposit are substantially similar to the corresponding rib lengths of the measured deposit, (h) determining the deposit properties along the ribs of the simulated deposit, and assigning the same deposit properties along the corresponding ribs of the measured deposit, (i) interpolating the deposit properties at a point within the measured deposit based on the deposit properties along the nearby ribs. In addition, the properties of the deposit at points outside the thickness contour may be predicted from the simulated deposit by extending the ribs and backbone of the measured and simulated deposits by a fixed percentage of their lengths. The properties of the deposit include the thickness of the sediment body, the size of the body, the shape of the body, and the grain size distribution at any point within the body, and any combination thereof.

DETAILED DESCRIPTION

In the following detailed description, the invention will be described in connection with its preferred embodiment. However, to the extent that the following description is specific to a particular embodiment or particular use of the invention, this is intended to be illustrative only. Accordingly, the invention is not limited to the specific embodiment described below, but rather the invention includes all alternatives, modifications, and equivalents falling within the true scope of the appended claims.

The present invention is a method for predicting the size, shape, and internal properties of a sand deposit from seismic data. Specifically, the inventive method can be applied to finding the size, shape, and grain size distribution at any point within a water-lain sedimentary body using a thickness contour of the body or the mapview outline of the body.

As will be understood to those skilled in the art, the deposition of clastic sedimentary bodies typically begins with a flow of sediment-laden water from a confined channel or inlet, such as a river mouth, into an open region, such as a basin. Initially such flows expand freely and deposit sediment as flow velocity decelerates. The properties of the flow and deposit are tightly related, so that the fluid mechanics of sediment-laden flows can be used to extrapolate detailed properties of the bodies deposited by such flows.

Applicants discovered that applying reasonable assumptions to these principles facilitates an analytical procedure providing a physical and empirical principle-based quantification of the characteristics of fluid flow-deposited sand bodies. This relationship between fluid flow principles and sedimentary body characteristics facilitates a method which allows characterization of the overall properties of the deposit based on only a minimum amount of initially available data. That method, in its various embodiments, is the subject of the present invention.

The inventive method is built on the assumption that the grains which compose the deposit are carried and deposited by a sediment laden fluid flow with height $h(x,y)$, x-velocity $u(x,y)$, and y-velocity $v(x,y)$. The fluid flow contains a volume fraction $C_i(x,y)$ of grains of the ith grain size bin. The ith grain size bin contains grains of nominal characteristic diameter $d_i$ which may, for example, have actual characteristic diameters ranging from 84% to 119% of $d_i$. The grains of the ith grain size bin fall through still water with a terminal velocity (also referred to as a settling velocity) $v_{si}$. The time duration over which deposition persists to form the deposit is T, and the resulting deposit thickness is $A(x,y,T)-A(x,y,0)$.

Figure 1:
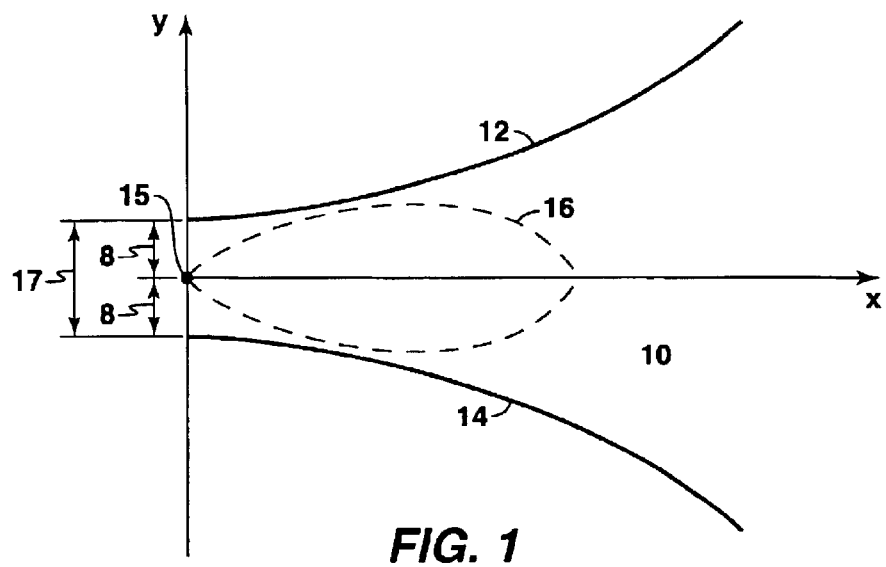
FIG. 1 is a plan view of a fluid flow which is depositing a sedimentary body, including the flow boundaries.

FIGS. 1, 2, 3, and 4 depict the assumptions and parameters used in the present invention. FIG. 1 depicts a plan view of fluid flow 10 with flow boundaries 12 and 14. Inlet 15 for fluid flow 10 is centered, for convenience, at the origin of the x and y-axes, and flow emitted from the inlet moves initially in the positive x direction. At the inlet 15, the flow boundary has an initial width 17, a half-width of 8, and expands in the positive x direction. Also depicted is a constant thickness contour 16 of the deposit formed by the fluid flow.

Figure 2:
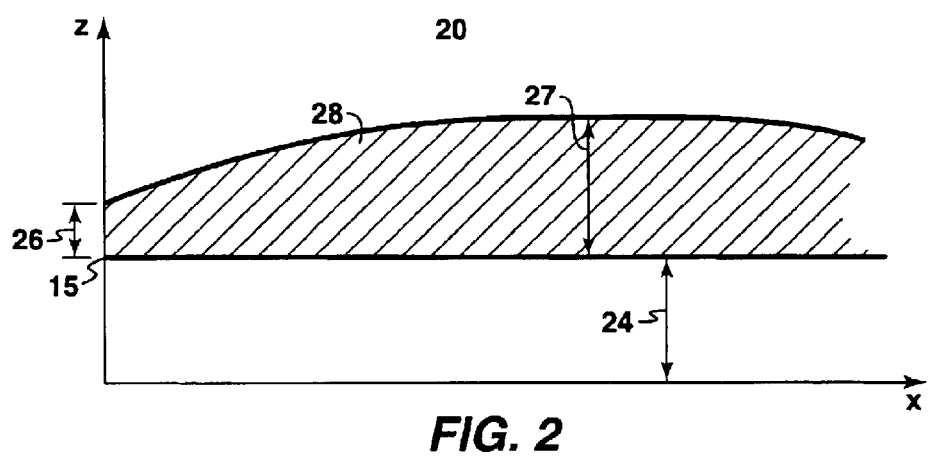
FIG. 2 is an elevation view corresponding to plan view FIG. 1.

FIG. 2 depicts an elevation view corresponding to plan view FIG. 1. The fluid inside the flow boundaries 12 and 14 of FIG. 1 is comprised of two layers.

FIG. 2 illustrates the two layers of fluid as a clear layer 20 above a sediment-laden layer 28. The sediment-laden layer 28 is also referred to herein as the turbid water layer. The elevation of the bottom topography before the deposition process occurs is 24. The height of the sediment-laden water layer at inlet 15 is 26. The height of the sediment-laden water layer 28 varies based on location, as evidenced by the fact that at a different location in FIG. 2, the sediment-laden water layer has a different height 27.

Figure 3:
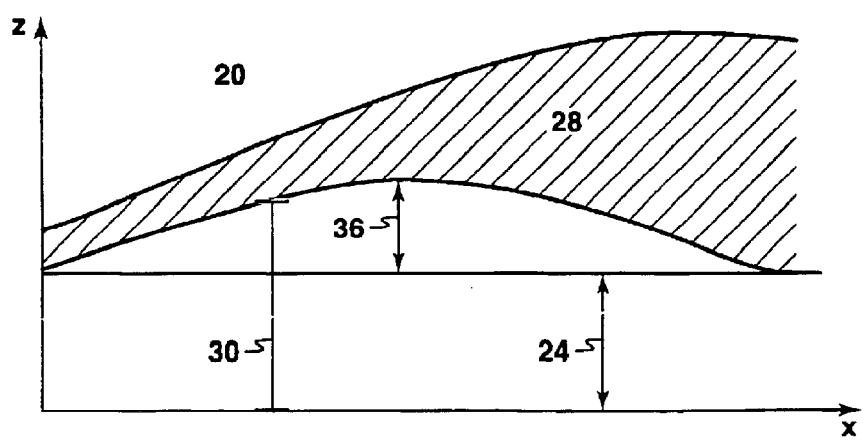
FIG. 3 is an elevation view corresponding to plan view FIG. 1 after deposition has occurred.

FIG. 3 is an elevation view corresponding to the plan view of FIG. 1 after deposition has occurred. As in FIG. 2, the fluid flow in FIG. 3 is depicted as being comprised of clear layer 20 above a turbid layer 28. The elevation of the bottom topography after deposition is 30. This elevation consists of the elevation of the original bottom topography 24 in addition to the thickness of the newly deposited sediment layer 36.

Figure 4:
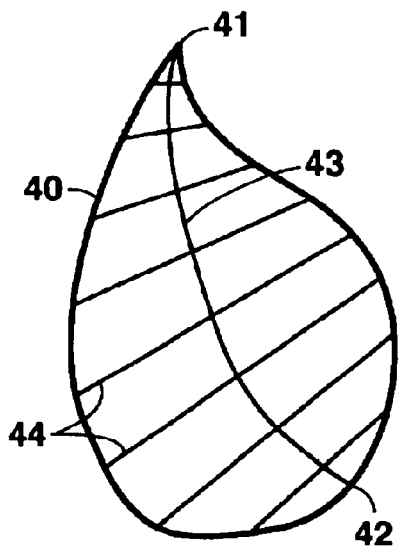
FIG. 4 shows a plan view constant deposit thickness contour with a "backbone" and "ribs" inscribed.

FIG. 4 shows a mapview of a constant deposit thickness contour 40. The inlet point 41 and end point 42 are shown. A backbone 43 is shown which is a smooth curve connecting the inlet point 41 and end point 42. Ribs 44 are shown. Each rib is a straight-line segment with end points on the contour, is perpendicular to the backbone, and is bisected by the backbone. The ribs and backbones may be used to represent the dimensions of the deposit, and will be described in greater detail below.

Table 1 provides a detailed list of the parameters used in the present method. As is indicated in Table 1, the height $h_0$ and velocity $u_0$ of the turbid water flow at the inlet are assumed to be a constant across the width of the inlet along the y-axis. The velocity $u_0$ is also constant vertically through the thickness of the flow. The inlet half-width b is also defined. Thereafter, based on the procedure described herein, the height h and velocity components u and v of the turbid water layer are functions of position with respect to the x and y axes. Velocity components u and v are assumed to be constant through the depth (z-axis) of the turbid water layer. The turbid water layer is assumed to have a volume fraction $C_i$ of grains of the ith grain size bin averaged through the depth of the layer, but that volume fraction varies with x and y throughout the flow.

The deposit, which is formed from the turbid water layer flow is assumed to be the result of the net deposition from that flow. The net deposition rate for grains of the ith grain size is the difference between the deposition rate $D_i$ onto the bottom and the erosion rate $E_i$ from the bottom back into the turbid water layer.

The deposition process varies with the sediment concentration, and the erosion process varies with the flow velocity and the composition of the bottom, so the net deposition will also vary with x and y location, producing a deposit of laterally varying grain size distribution and thickness.

Figure 5:
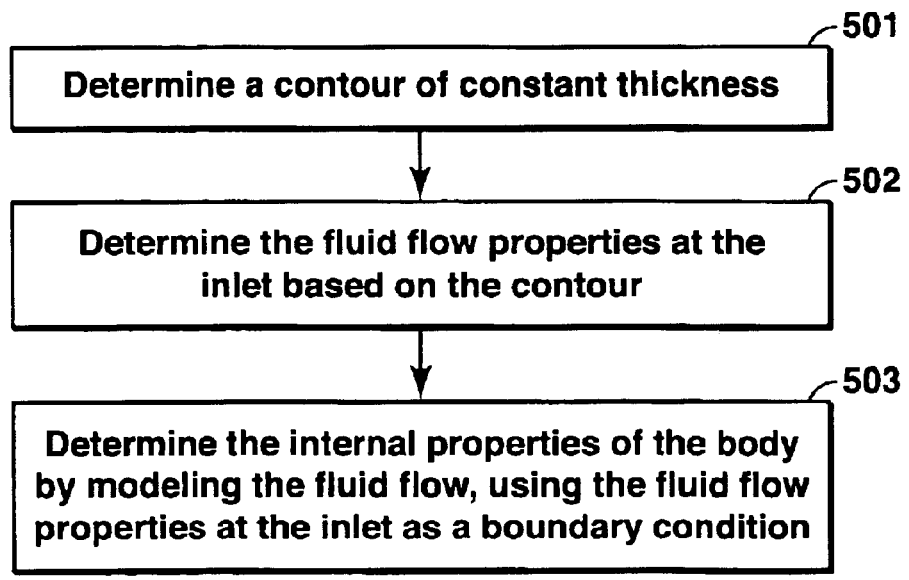
FIG. 5 is a flow chart of a first embodiment of the invention.

A first embodiment of the present invention will now be described. With reference to FIG. 5, this embodiment involves an iterative analysis procedure to establish the flow parameters at the inlet constrained by a thickness contour of the deposit, and to use these inlet properties as boundary conditions to simulate the full flow and the resulting deposit. In this way, the full size, shape, and internal properties of the deposited body may be established. As shown in FIG. 5, in one embodiment, there are three steps. First, a contour of constant thickness is determined (step 501). Second, the fluid flow properties at the inlet are determined using the constant thickness contour (step 502). Finally, the inlet fluid flow properties are used as a boundary condition for simulating the properties of the deposit, including the resulting grain size distribution at any point in the deposit (step 503). The individual steps are described in further detail below.

Figure 6:
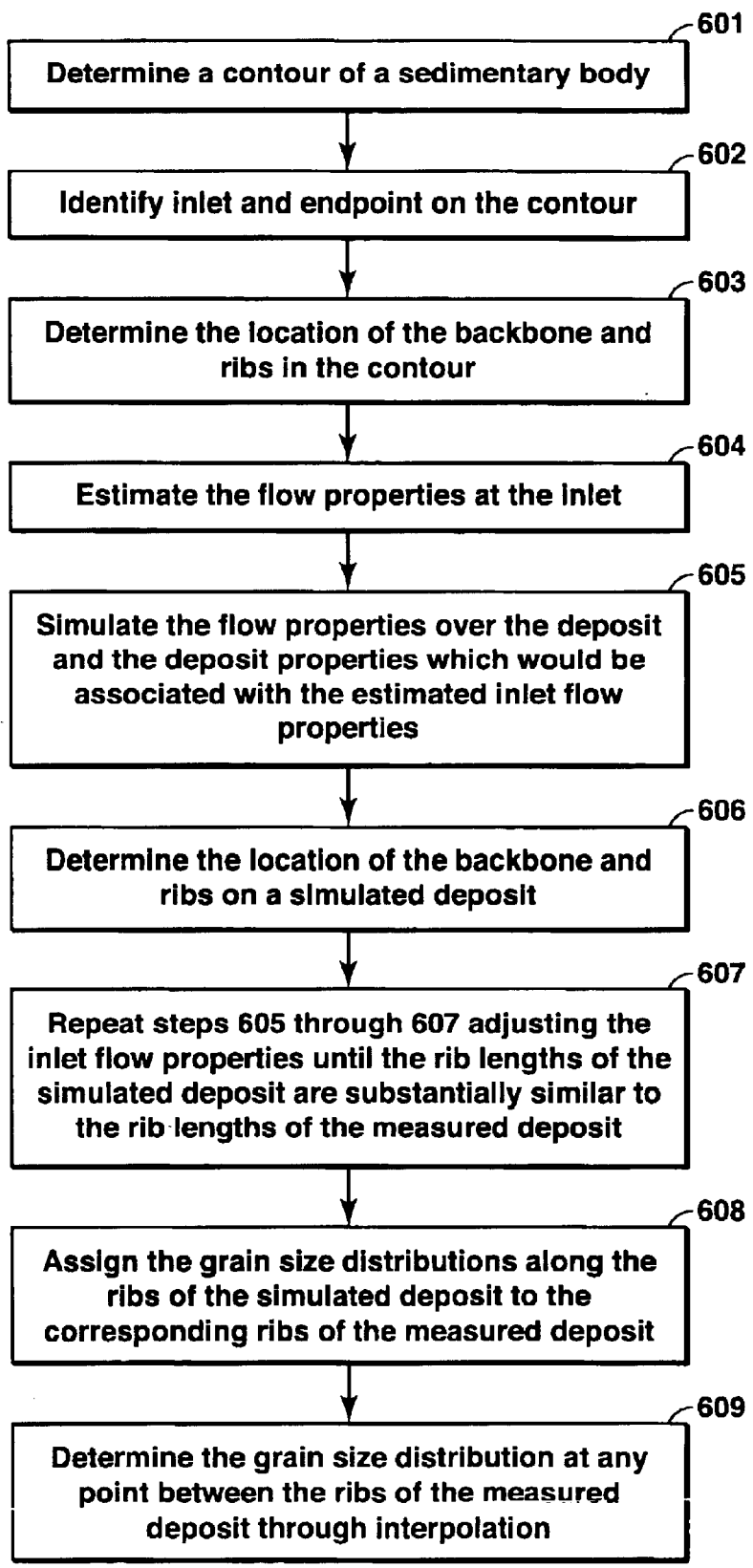
FIG. 6 is a flow chart of a second embodiment of the invention.

A second embodiment of the present invention will now be described. FIG. 6 is a detailed flow chart of the second embodiment. As shown in FIG. 6, first, at least one contour of the sand body is determined (step 601). This is a contour of constant thickness, typically obtained from seismic data. A point on the contour is designated the "inlet" and a second point on the contour is designated the "end point" (step 602). A "backbone" and a selected number of "ribs" are automatically determined within the outline, and the length of the backbone and of each rib is noted (step 603). The flow properties at the inlet are estimated (step 604).

The flow properties and deposit properties are simulated over the deposit region, using the flow properties at the inlet as a boundary condition. The flow properties may include but are not limited to, flow velocity, suspended sediment volume fractions, deposition time, and flow height. The deposit properties may include, but are not limited to, the thickness of the sediment body, the size of the body, the shape of the body, the grain size distribution at each point within the body and other properties of the body that may be calculated or inferred from the simulated flow properties (step 605). A "backbone" is determined through the simulated deposit, beginning at the inlet and ending at a distance from the inlet equal to the length of the backbone of the measured deposit. "Ribs" of the simulated deposit are determined which span the width of the thickness contour intersected by the backbone (step 606).

The inlet flow properties are adjusted and steps 604 through 607 are repeated until the inlet properties are found for which the simulated rib lengths are substantially equal to the measured rib lengths (step 607). The deposit properties are noted along each of the ribs of the simulated deposit, and the same deposit properties are assigned along the corresponding ribs of the measured deposit (step 608). The deposit properties at locations between the ribs of the measured deposit are determined by interpolation from deposit properties at the nearest ribs (step 609).

The steps of the inventive methods are now described in greater detail in connection with their preferred embodiment. The first step is to determine a contour of constant deposit thickness (steps 501 or 601). For example, the mapview outline of the deposit boundary is a contour of constant (zero) thickness. Alternatively, a thickness contour in a relatively thin deposit can be identified in a seismic cube as a contour of constant reflection amplitude. Alternatively, the contour of maximum brightness associated with the tuning thickness of the deposit as observed in a seismic cube can be used. Alternatively, a thickness contour may be determined as a contour of constant vertical distance between mapped horizons in an interpreted seismic cube. Alternatively, persons skilled in the art will recognize other methods by which contours of constant thickness may be determined for a sedimentary body. The actual thickness associated with the constant thickness contour, when available, improves the performance of this method, but is not essential for its operation.

In one embodiment, the second step is to determine the location of the inlet and end point (step 602). The location of the "inlet" point and the "end point" can be manually or automatically indicated on the outline of the deposit. The determination of these points is based on the interpreted flow direction, where the inlet is the point furthest up flow, and the end point is the furthest down flow point on the interpreted centerline of the flow.

In one embodiment, the third step is to inscribe a backbone and ribs within the contour (step 603). The backbone is defined as a smooth curve connecting the inlet point and the end point. The ribs are straight-line segments with both end points on the contour. The ribs intersect the backbone at pre-determined fractions of the total backbone length, typically at 5%, 15%, 25%, . . . , and 95% of the backbone length. The ribs are also bisected by the backbone and are perpendicular to the backbone at the bisection point. The backbone location and rib locations may be determined in an automated fashion by four steps. First, guessing the rib-backbone intersection points. Second, fitting the backbone to those points using a bicubic interpolation. Third, finding the associated candidate ribs, and finally, iteratively adjusting the intersection points until they come at the appropriate intervals on the backbone and produce perpendicular ribs which are bisected by the backbone. The backbone length and rib lengths for the measured deposit are noted.

In one embodiment, the fourth step is to estimate the flow properties at the inlet (step 502 or 604). In this embodiment of the invention, the properties which must be specified at the inlet are the flow velocity in the x direction (the flow velocity in the y direction is assumed to be zero at the inlet), the flow height, the suspended sediment volume fraction in each grain size bin, and the width of the inlet. When it is not possible to uniquely determine each of these properties from a deposit thickness contour atone, additional information and/or assumptions about relationships between inlet properties must be supplied. In this embodiment, it is assumed that (a) the size distribution of suspended grains at the inlet is known from well control or provenance studies, though the total suspended sediment volume at the inlet is unknown. (b) The flow height at the inlet, $h_0$, and the inlet width, b, are assumed to be related to the flow velocity, $u_0$, according to the following relationships, $$h_0 = a^2 c^3 u_0^2 \quad [1a]$$

$$b = a^2 u_0 \quad [1b]$$

Equations (1a) and (1b) are based on the work of Huang and Nanson (2000) and Huang (1996). The parameters a and c are empirically derived and, as indicated in Huang, typically have the values a=4.33 and c=0.22 $d_{50}^{-0.11}$, where $d_{50}$ is the median grain diameter at the inlet. This relationship was originally derived for river flows, but can reasonably be applied to channelized flows in other types of systems. In the alternative, analogous relationships for other systems could be derived. (c) The flow velocity at the inlet $u_0$ is the slowest velocity sufficient to substantially prevent deposition of the suspended sediment at the inlet location. This provides a relationship between $C_{T0}$ and $u_0$. The combination of these assumptions leaves $u_0$ as the only independent variable at the inlet, which greatly simplifies the iterative search by which the inlet conditions are determined. As described below, the iterative search progresses until inlet conditions are found which are most consistent with the measured deposit thickness contour. The assumptions above about knowledge of and relationships between inlet properties are merely illustrative. Persons skilled in the art will recognize other assumptions that could be used, based on observed correlations or physical principles, to reduce the range of inlet property values which must be considered. Such other assumptions that aim to reduce the range of possible inlet conditions, in addition to or replacing one or more of those assumptions identified above, are also within the scope of this invention.

In one embodiment, the fifth step is to simulate the flow properties over the deposit and the deposit properties (step 503 or 605). This simulation solves the system of equations outlined by Parker, 1986 and, more recently, by Bradford and Katopodes, 1999. These equations are described in detail below.

In an embodiment, the net deposition process is assumed to be steady-state. In other words, the flow velocities, heights, and sediment volume fractions of the turbid water layer at each x and y location are constant throughout the deposition time T. The deposit which results is assumed to have a constant grain size distribution $G_i$ through the depth of the deposit, but that distribution can vary with x and y location throughout the deposit. The thickness of the deposit also varies with x and y location, as characterized by elevation A. Both the elevation of the deposit A and the grain size distribution of the deposit $G_i$ are assumed to be a function of both the deposition $D_i$ and the erosion $E_i$ that occurs during the fluid flow process. More specifically:

Deposit Thickness:

$$A(x, y, T) - A(x, y, 0) = \frac{T}{(1-\phi)} \sum_i (D_i(x, y) - E_i(x, y)), \quad [2a]$$

Grain Size Dist. in Deposit:

$$G_i(x, y) = \frac{D_i(x, y) - E_i(x, y)}{\sum_i (D_i(x, y) - E_i(x, y))}. \quad [2b]$$

In this model of the fluid flow process, deposition is assumed to be a function of the settling velocity of the grains in still water and the suspended sediment volume fractions:

Deposition Rate:

$$D_i(x, y) = \gamma_0 C_i(x, y) v_{si}, \quad [3]$$

where, for example, $v_{si}$ may be calculated using the settling velocity equations published by Dietrich (1982). The factor $\gamma_0$ is the factor by which the sediment concentration at the bottom of the flow exceeds $C_i$, the vertically averaged sediment concentration in the flow. Typically, $\gamma_0=2$, though other choices of $\gamma_0$ are feasible and are also within the scope of the invention.

It is generally understood that the erosion that occurs during the fluid flow process follows a complicated, empirically derived, relationship to the velocity of the flow. One such empirical erosion relationship is specified by Garcia and Parker (1991):

Erosion Rate:

$$E_i = \frac{\beta Z_i^5 v_{si} G_i}{1 + \beta Z_i^5 / 0.3} \quad [4]$$

$$Z_i = \lambda \frac{u^*}{v_{si}} R_{pi}^{0.6} \left(\frac{d_i}{p_{50}}\right)^{0.2} \quad [5]$$

$$R_{pi} = \frac{\sqrt{Rgd_i^3}}{v} \quad [6]$$

In these equations, the term, $$u^* = \sqrt{f(u^2 + v^2)} \quad [7]$$

is a shear velocity which is a function of the magnitude of the local flow velocity and a drag coefficient $f \approx 0.001-0.01$ depending on the nature of the sediment being deposited. Typically $f=0.002$. The grain size distribution is $G_i$ and the grain diameter associated with the 50$^{th}$ percentile of grain size in the deposit is $P_{50}$. The parameter $\beta=1.3\times10^{-7}$ and $\lambda=1-0.288\sigma_\phi$ where $\sigma_\phi$ is the standard deviation of the grain size distribution in the logarithmic "phi" units familiar to geologists.

The flow equations derive from the Navier-Stokes equations and continuity equations for a sediment laden flow beneath stationary clear water, and are important because the shape and internal properties of a deposited body depend on the flow field that deposited the body. For the motion of a turbid water layer, Parker, et al. (1986), Imran, et al. (1998), and Bradford and Katopodes (1999) all derived an appropriate system of equations. In a steady-state form, these equations can be written as follows:

X-Momentum:

$$\frac{\partial}{\partial x}(hu^2) + \frac{\partial}{\partial y}(huv) = -\frac{1}{2}Rg\frac{\partial C_T h^2}{\partial x} - RghC_T \frac{\partial A}{\partial x} - c_D u\sqrt{u^2 + v^2}, \quad [8]$$

Y-Momentum:

$$\frac{\partial}{\partial x}(huv) + \frac{\partial}{\partial y}(hv^2) = -\frac{1}{2}Rg\frac{\partial C_T h^2}{\partial y} - RghC_T \frac{\partial A}{\partial y} - c_D v\sqrt{u^2 + v^2}, \quad [9]$$

Sediment Conservation:

$$\frac{\partial huC_i}{\partial x} + \frac{\partial hvC_i}{\partial y} = E_i - D_i, \quad [10]$$

Fluid Conservation:

$$\frac{\partial hu}{\partial x} + \frac{\partial hv}{\partial y} = e_w\sqrt{u^2 + v^2}. \quad [11]$$

The multiplier term on the right hand side of the fluid conservation equation (11) is, $$e_w = \frac{0.00153}{0.0204 + F_r^{-2}}, \quad [12]$$

and will be recognized to those skilled in the art as an entrainment coefficient often given the symbol $e_w$. Persons skilled in the art will recognize other variations of this term that are also within the scope of this invention. This term is an empirical function of the local Froude number at each point in the flow. The Froude number is, $$F_r = \sqrt{\frac{u^2 + v^2}{RghC_T}} \quad [13]$$

As indicated, Equations 8 through 11 derive from the Navier-Stokes and continuity principles for a sediment-laden flow beneath stationary clear water. However, certain assumptions are made in using these equations to determine the flow field in the present invention. Persons skilled in the art with the benefit of the disclosures herein will recognize other equations could be used to calculate the flow properties. All such equations are intended to be within the scope of this invention. These assumptions include: 1) that the sediment-laden portion of the flow is assumed to have at each x, y location, a uniform velocity and consistent sediment concentration profile vertically through its thickness, and 2) that the flow field is constant across the entire width of the inlet, as expressed in the following boundary conditions:

Inlet boundary conditions:

$$u(0, y) = \begin{cases} u_0 & |y| \leq b \\ 0 & |y| > b. \end{cases} \quad [14a]$$

$$h(0,y) = h_0 \quad |y| \leq b. \quad [14b]$$

$$C_i(0,y) = C_{i0} \quad |y| \leq b. \quad [14c]$$

Although Equations 2a, 2b and 8–11 are derived assuming a flow in steady state, this assumption is not a limitation on the method. In the steady-state case, the elevation of the bottom below the flow is A=A(x, y,0) in Equations 8 and 9, commonly assumed to be zero. The flow properties could be allowed to vary with time, in which case the elevation of the bottom, A, would vary with time, and time derivatives of the conserved quantities would be added to Equations 8–11 (see Bradford and Katopodes, 1999). Equation 2a would be rewritten to give the time derivative of deposit thickness, and Equation 2b would give the grain size distribution as it varied with time or depth in the deposit. In the preferred embodiment of the time-varying version, the simulation would run forward in time until the deposit became large enough to substantially deflect the flow that built it. At this terminal point, the deposit would be regarded as nearly resembling a real deposit with the same inlet conditions. Although this time-varying version of the invention would in principle more accurately describe real deposits, the steady state approximation is presented as the preferred embodiment because of computational time savings.

Computational techniques for solving systems of partial differential equations describing fluid flows, such as the above equations, are well known to those skilled in the art. A variety of techniques are available, including but not limited to control volume methods. Solutions to the flow equations could be pre-calculated for the possible range of inlet properties. Then, the solution to this system of partial differential equations for given inlet conditions could be determined by looking up the appropriate pre-calculated solution in computer memory, rather than repeatedly re-solving the equations during the application of this method.

Now referring to step 606, once the flow and deposit properties have been simulated, a backbone and ribs may be determined for the simulated deposit. The backbone of the simulated deposit begins at the inlet point and proceeds along the centerline of the deposit, which, due to symmetry, is the x-axis. The end point of the backbone is determined to make the backbone for the calculated deposit the same length as the backbone of the measured deposit. The outline of the calculated deposit is now defined as the contour of constant thickness passing through the end point of the backbone. As was the case for the measured deposit, the ribs of the calculated deposit will be line segments with end points on the constant thickness contour which (a) intersect the backbone at pre-determined fractions of the total backbone length, (b) are bisected by the backbone, and (c) are perpendicular to the backbone at the bisection points. The rib lengths for the simulated deposit are noted.

Step 607 repeats steps 604 through 607, adjusting the inlet flow properties in step 604 until the rib lengths of the simulated deposit are substantially equal to the rib lengths of the measured deposit. If more than one thickness contour can be determined from the measured deposit, then rib lengths associated with both contours can be used in this step. If the thickness of the simulated deposit is known and the thickness at the measured contour is also known, then matching this thickness is preferably also performed in this step, along with matching rib lengths.

The time-varying method would provide realistic simulated deposit thickness if the simulation runs until the deposit substantially diverts the flow that builds it. The steady-state method only provides the actual thickness of the simulated deposit if T is determined in some way, typically based on an assumption about how the maximum deposit height is related to the inlet conditions. One example of such an assumption can be derived from the work of Baines (1995). Under this assumption, the deposit grows until it is large enough to divert the flow that produces it. This diversion occurs when the maximum deposit thickness is approximately, $$z_{max} = qh_0 \left[ \frac{(8F_{r0}^2 + 1)^{3/2} + 1}{16F_{r0}^2} - \frac{1}{4} - \frac{3}{2}F_{r0}^{2/3} \right], \quad [15]$$

where $F_{r0}$ is the Froude number of the flow at the inlet. The deposition time T is then determined so that thickness $Z_{max}$ is achieved at the point of maximum net deposition rate in the steady-state solution. Because Baines' work involved two-dimensional air current flows over obstructions, a scaling constant q has been added to relate the two-dimensional result to the three-dimensional behavior of the hydrodynamic flows of interest. In the present method, scaling constant q is determined from numerical modeling to be approximately 0.9. This value of q depends on the three-dimensional shape and size of the deposit, and the relationship of that shape and size to the ability of the deposit to divert the particular flow, and may be modified for other flows.

Step 608 assigns deposit properties along the ribs of the measured deposit. The deposit properties along the ribs of the measured deposit should be equal to the deposit properties along the corresponding ribs of the simulated deposit. If more than one contour is used in determining the inlet properties, then ribs from the largest of the contours would typically be used for the mapping of properties from the simulated to the measured deposit.

Step 609 interpolates the deposit properties in the measured deposit at one or more locations of interest. Based on the deposit properties determined along the ribs, deposit properties can be interpolated at points not on the ribs. Persons skilled in the art with the benefit of the disclosure herein will recognize many common interpolation techniques that can be used with this invention. One possible interpolation method would be to create, for each point of interest in the measured deposit, an additional rib passing through the point of interest in the measured deposit and being perpendicularly bisected by the backbone. A corresponding rib would then be created for the simulated deposit, intersecting the backbone at the same distance along the backbone. The deposit properties at the same rib and backbone position in the simulated deposit would then be assigned to the point of interest in the measured deposit.

In an alternate embodiment of the invention, deposit properties may be extrapolated outside the thickness contour by extending the ribs beyond the constant thickness contour of both the simulated and measured deposits in steps 608–609. This extrapolation has application to predicting the lateral extent and properties of a deposit when the deposit is too thin to be visible in seismic data.

Using the method of steps 608 and 609, any property of the simulated deposit and flow can be determined for the measured deposit. These properties include, but are not limited to, size of the body, shape of the body, grain size distribution at any point in the body, flow velocity above the body, suspended sediment volume fractions above the body, flow height above the body, and any combination thereof. Furthermore, deposit properties such as bedding type, which are not explicitly treated in the simulation but are related by published or otherwise known correlations and measurements to the explicitly simulated flow and deposit properties, may also be inferred. Additionally, if the thickness of the measured or simulated deposit can be determined for at least one location, then the measured deposit thickness at all locations may also be determined.

TABLE 1

| Parameter | Numeric Reference in FIGS. | Definition of Parameter |
|---|---|---|
| b | 8 | Half-width of the inlet. The inlet is located at x = 0 and y between b and −b. |
| $h_0$ | 26 | Height of the turbid water layer at the inlet, constant across the width of the inlet. |
| $u_0$ | | Velocity of the turbid water flow out from the inlet. The flow is assumed to be in the positive x direction, and the velocity is assumed to be constant laterally across the width of the inlet and vertically through the height of the flow. |
| h(x,y) | 27 | Height of the turbid water layer. |
| u(x,y) | | X-velocity component of the turbid water layer. |
| v(x,y) | | Y-velocity component of the turbid water layer. |
| T | | Time during which the deposit is built before it diverts the flow. |
| A(x,y,t) | | Time dependent elevation of the bottom topography. |
| A(x,y,0) | 24 | Elevation of the bottom topography before deposition. |
| A(x,y,T) | 30 | Elevation of the bottom topography after deposition for time period T. |
| $C_i$(x,y) | | Vertically averaged volume fraction of the turbid water layer consisting of sediment in the ith grain size bin. |
| $C_T$(x,y) | | Total volume fraction of the turbid water layer consisting of sediment. This is the sum of $C_i$(x,y) over all grain size bins. |
| $G_i$(x,y) | | Grain size distribution in the deposit. Sum of $G_i$ over all is i = 1. |
| $E_i$(x,y) | | Erosion rate for the ith grain size bin |
| $D_i$(x,y) | | Deposition rate for the ith grain size bin |
| $Z_i$ | | Parameter defined in Equation 5 |
| $R_{pi}$ | | Particle Reynolds number |
| $d_i$ | | Grain diameter of the i-th grain size bin |
| $d_{50}$ | | Median grain diameter in the flow at the inlet. |
| $p_{50}$ | | 50$^{th}$ percentile of grain size in the deposit |
| $v_{si}$ | | Settling velocity of grains of diameter $d_i$ in still water |
| R | | Ratio of the density difference between the sediment and water to the density of water |
| φ | | Porosity of the deposit. Assumed to be 0.4 |
| a | | Empirical parameter used in Equation 1 |
| c | | Empirical parameter used in Equation 1 |
| g | | Gravitational constant, 9.8 m/s$^2$ |
| $e_w$ | | Entrainment coefficient. |
| $F_r$ | | Froude number |
| f | | Drag coefficient for erosion, typically 0.002. |
| $c_D$ | | Bottom drag coefficient for flow, typically 0.002. |
| q | | Scaling constant used in Equaztion 15 |
| ν | | Kinematic viscosity of water. Assumed to be 0.01 cm$^2$/s. |
| $γ_0$ | | A constant assumed to be 2. |

What is claimed is:

1. A method for predicting the properties of a sedimentary deposit, the method comprising:

(a) determining at least one contour of constant deposit thickness in the sedimentary deposit;

(b) determining at least one fluid flow property at the inlet of the sedimentary deposit by using the constant deposit thickness contour;

(c) determining at least one property of the deposit for at least one point inside the sedimentary deposit by simulating the fluid flow.

2. The method of claim 1 wherein the fluid flow is simulated through numerical modeling by using the fluid flow properties at the inlet as a boundary condition.

3. The method of claim 1 wherein at least one flow property is selected from the group consisting of flow velocity, suspended sediment volume fractions, deposition time, flow height, and any combination thereof.

4. The method of claim 2 wherein at least one property of the deposit at any point is determined by simulating the fluid flow which built the deposit using information about the fluid flow properties at the inlet of the deposit obtained from a constant thickness contour of the deposit.

5. The method of claim 1 wherein at least one property of the deposit at any point is selected from the group consisting of the thickness of the sediment body, the size of the body, the shape of the body, the grain size distribution at each point within the body, median grain size, grain sorting, bedding type and any combination thereof.

6. The method of claim 1 wherein at least one flow property at the inlet is estimated by assuming the sediment volume fraction in each size bin supplied at the inlet to be a known function of flow velocity and the function is determined by a method chosen from the group consisting of: empirical correlations, grain size measurements from nearby or related systems, computer simulation of the attributive system, provenance studies, and any combination thereof.

7. The method of claim 1 wherein the contour of constant deposit thickness is the mapview outline of the deposit.

8. A method for predicting at least one deposit property at any location within a sedimentary deposit, the method comprising:

(a) determining at least one contour of constant deposit thickness in a measured deposit;

(b) determining an inlet point and end point for the measured deposit from the outline of constant deposit thickness;

(c) creating a backbone curve connecting the inlet point and end point for the measured deposit and creating ribs perpendicular to the backbone;

(d) estimating the flow properties at the inlet of the measured deposit;

(e) simulating the flow properties and deposit properties corresponding to the estimated inlet flow properties;

(f) determining the backbone and ribs of the simulated deposit;

(g) repeating steps (d) through (g) until the rib lengths of the simulated deposit are substantially similar to the corresponding rib lengths of the measured deposit;

(h) determining at least one deposit property along the ribs of the simulated deposit, and assigning at least one deposit property along the corresponding ribs of the measured deposit;

(i) determining at least one deposit property in at least one point in the measured deposit based on at least one deposit property along the neighboring ribs.

9. The method of claim 8 wherein the grain size distribution at any point inside the sedimentary deposit is determined by establishing grain size distributions along the ribs of the measured deposit, and interpolating the grain size distribution at any point inside the sedimentary deposit.

10. The method of claim 8 further comprising determining the thickness at any point inside the sedimentary deposit by simulating at least one flow property.

11. The method of claim 8 wherein the thickness of the deposit is determined by dividing the thickness at the measured thickness contour by the thickness at the calculated contour and multiplying the calculated thicknesses everywhere by this scale factor.

12. The method of claim 8 further comprising extrapolating the deposit properties by extending the backbone and ribs of the measured and simulated thickness contours outside the contours.

13. The method of claim 12 further comprising predicting the lateral extent of the deposit.

14. The method of claim 8 wherein at least one flow property is selected from the group consisting of flow velocity, suspended sediment volume fractions, deposition time, flow height, and any combination thereof.

15. The method of claim 8 further comprising determining the properties of the deposit at any point from simulating the fluid flow.

16. The method of claim 15 wherein at least one property of the deposit at any point is selected from the group consisting of the thickness of the sediment body, the size of the body, the shape of the body, bedding type, and the grain size distribution at each point within the body, and any combination thereof.

17. The method of claim 8 wherein at least one flow property at the inlet is estimated by assuming the sediment grain size distribution at the inlet to be a known function of flow velocity and the function is determined by a method from the group consisting of: empirical correlations, grain size measurements from related systems, computer simulation of the attributive system, provenance studies, and any combination thereof.

18. The method of claim 8 wherein the outline of constant deposit thickness is the mapview outline of the deposit.

19. The method of claim 8 wherein step (g) involves repeating steps (d)–(g) until both the rib lengths and the deposit thickness at the contour are substantially similar.

* * * * *